United States Patent [19]

Chan et al.

[11] Patent Number: 5,671,368
[45] Date of Patent: Sep. 23, 1997

[54] PC CARD CONTROLLER CIRCUIT TO DETECT EXCHANGE OF PC CARDS WHILE IN SUSPEND MODE

[75] Inventors: Reginia K. Chan, Fremont; Yishao Max Huang, San Jose, both of Calif.

[73] Assignee: O₂ Micro, Inc., Santa Clara, Calif.

[21] Appl. No.: 605,752

[22] Filed: Feb. 22, 1996

[51] Int. Cl.⁶ .............................. H02H 9/00; G06F 9/44; G06F 1/32

[52] U.S. Cl. .............................. 395/282; 395/280; 395/283; 395/750; 395/700

[58] Field of Search ................................ 395/280, 282, 395/283, 750, 700

[56] References Cited

U.S. PATENT DOCUMENTS 5,555,510  9/1996  Verseput et al. .

Primary Examiner—Jack B. Harvey
Assistant Examiner—Rupal D. Dharia
Attorney, Agent, or Firm—Donald E. Scheiber

[57] ABSTRACT

A PC Card controller, adapted for use in a laptop or notebook computer, generates a fake PC Card-insertion interrupt when a CPU, included in the computer, resumes normal operation after being in a lower power, Suspend operating mode. The PC Card controller includes a host-computer bus-interface adapted for exchanging interrupt signals with a bus included in the host computer. The PC Card controller also includes a PC Card interface-circuit for exchanging digital signals with a PC Card inserted into a PC Card socket included in the host computer. Insertion of a PC Card into the PC Card socket, while the CPU is in its normal operating mode, causes the PC Card interface-circuit to generate an interrupt signal for transmission to the CPU. The PC Card controller also includes a suspend/resume pin that receives a suspend/resume signal generated within the host computer. A fake PC Card-insertion-interrupt generating-circuit, upon detecting a state change in the suspend/resume signal that indicates resumption of normal CPU operation, generates an interrupt signal which simulates insertion of a PC Card into the PC Card socket.

18 Claims, 3 Drawing Sheets

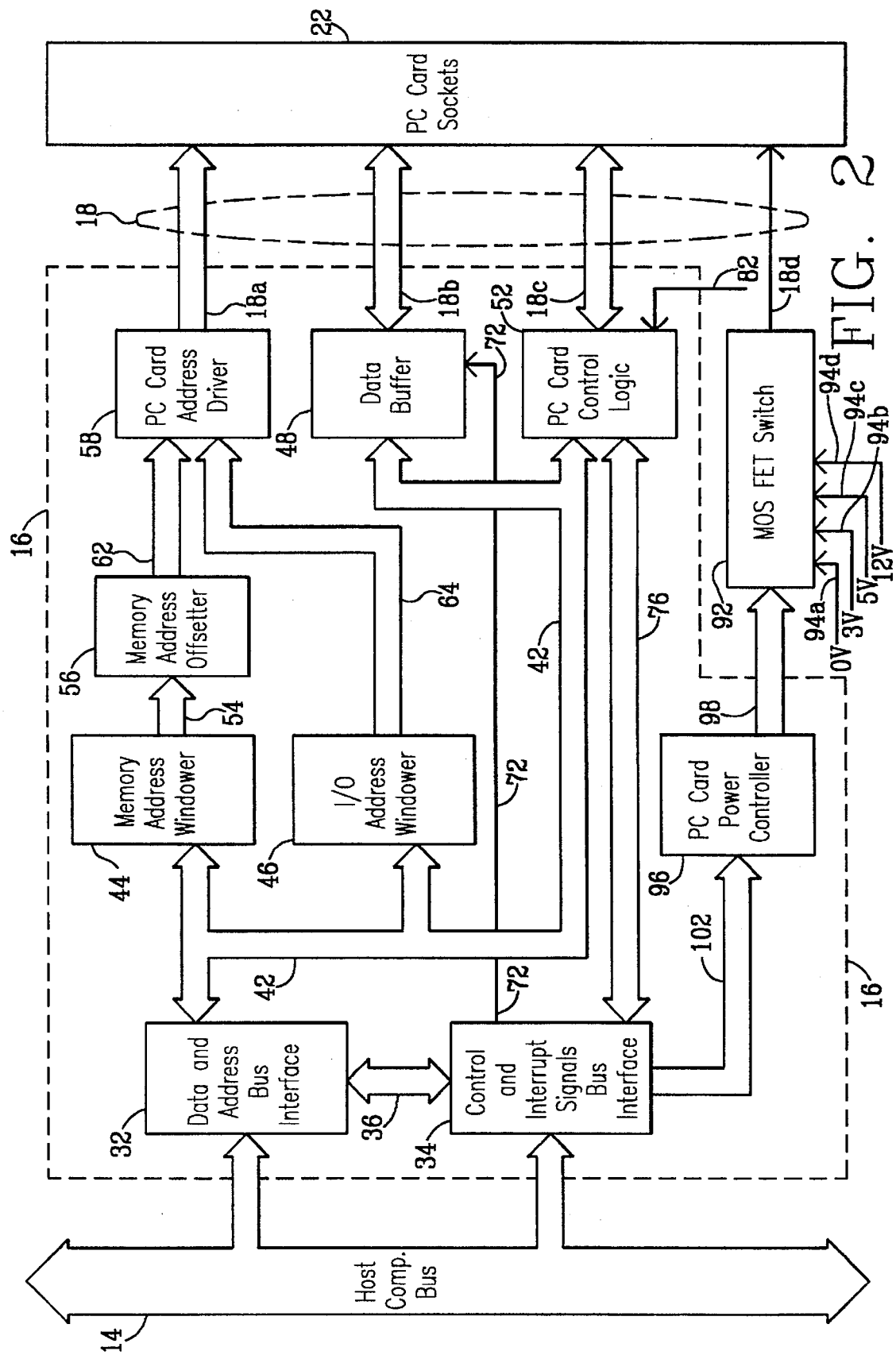

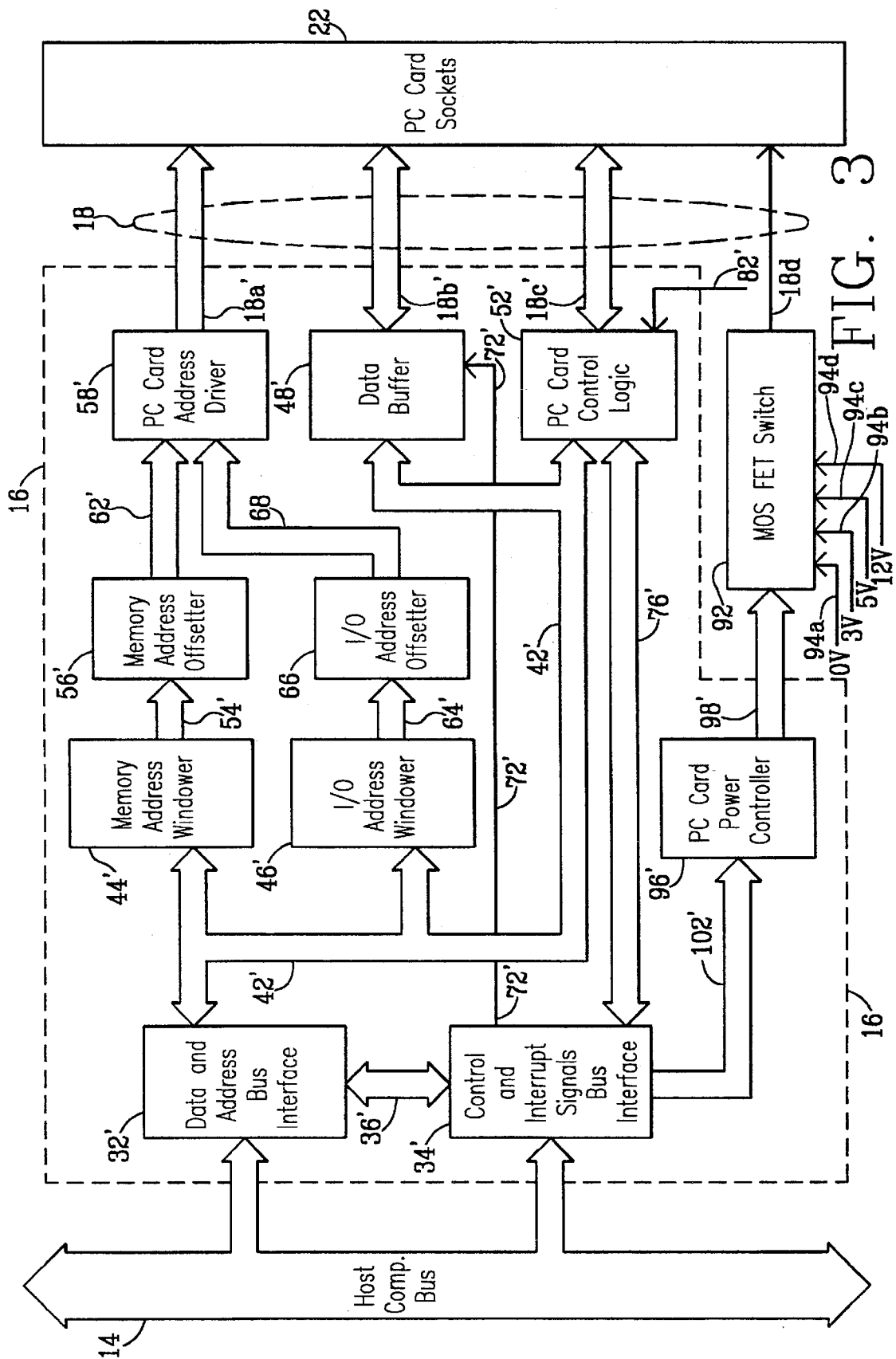

PC CARD CONTROLLER CIRCUIT TO DETECT EXCHANGE OF PC CARDS WHILE IN SUSPEND MODE

BACKGROUND OF THE INVENTION

1. Field of the Invention

The present invention relates generally to digital computers and, more particularly, to a PC Card controller that permits avoiding electrical damage to PC Cards, and that facilitates avoiding software breakdowns caused by an inopportune exchange of PC Cards.

2. Description of the Prior Art

To facilitate controlling power consumption in portable personal computers such as laptop or notebook computers, 386 SL and 486 SL Enhanced IC microprocessors manufactured by Intel Corporation of Santa Clara, Calif. provide a System Management Mode ("SMM") of operation. SMM in these microprocessors provides a separate environment for the execution of power management routines that is completely independent of the environment in which the operating system and application programs execute. For such microprocessors, a special system management interrupt ("SMI") activates the SMM environment. For Intel's 386 SL and 486 SL microprocessors, power management routines executed in SMM in response to specific SMIs may cause the personal computer to enter a "Suspend" mode of operation in which the computer consumes a lesser amount of electrical power because certain parts of the personal computer are turned off, e.g. the display and any backlighting for the display, the hard disk, the modem, etc. Subsequently, the microprocessor's execution of a resume operation in response to a SMI restores power to, and thereby once again fully activates, the personal computer.

Present laptop and notebook computers usually include one or more PC Card (f/k/a Personal Computer Memory Card International Association ("PCMCIA")) sockets. A PC Card socket receives various different types of peripheral devices, e.g., modems, hard disk drives, "Flash" random access memory ("RAM") cards, etc. PC Cards adapted for insertion into a PC Card socket may operate at either five (5.0) volts or at three (3.0) volts. Each such PC Card and PC Card socket includes a Card Detect ("CD") pin and a 5 Volt Detect pin. The CD pin permits a computer to detect insertion of a PC Card into a PC Card socket. Upon insertion of a PC Card into a computer's PC Card socket, a PC Card is immediately interrogated to determine whether the PC Card being inserted operates either at 3.0 volts or at 5.0 volts. The PC Card controller then provides the appropriate voltage to the PC Card socket. After the appropriate voltage has been applied to the PC Card socket, a computer program then interrogates the PC Card to determine what type of PC Card has been inserted into the PC Card socket.

However, if a laptop or notebook computer begins operating in its lower power, Suspend mode as described above, it does not detect or respond to removal of a PC Card from the PC Card socket followed by insertion of a PC Card into the PC Card socket. Consequently, if after the computer begins operating in Suspend mode the PC Card is changed from a 5.0 volt card to a 3.0 volt card, the computer cannot sense that the exchange has occurred. Under such circumstances, when the computer resumes operating in its higher power mode, it will apply 5.0 volts, rather than the proper 3.0 volts, to the PC Card. If 5.0 volt electrical power is applied to a 3.0 volt PC Card, it is almost certain that the PC Card will be permanently damaged. Since presently PC Card cards are comparatively expensive, e.g. $200.00 for a modem which plugs into a PC Card socket, owners of PC Card cards can lose a significant financial investment if an excessively high voltage is applied to their PC Card.

Even if two PC Cards, which are exchanged while a laptop or notebook computer is in its Suspend operating mode, both operate at the same voltage, the inability of the laptop or notebook computer to detect a PC Card change while in the Suspend operating mode generally results in a computer software breakdown. That is, if while a laptop or notebook computer is in its Suspend operating mode, a modem PC Card, for example, is replaced with a hard disk drive PC Card, when the notebook or laptop computer resumes normal operation the computer's software attempts to access the hard disk drive PC Card as if it were the modem PC Card. Under such circumstances, a computer software breakdown almost certainly occurs that necessitates "re-booting" the computer.

SUMMARY OF THE INVENTION

An object of the present invention is to provide a PC Card controller that prevents a computer, upon resuming normal operation after being in its Suspend operating mode, from failing to detect an exchange of PC Cards while the computer was in its Suspend operating mode.

Another object of the present invention is to provide a PC Card controller that prevents a computer, upon resuming normal operation after being in its Suspend operating mode, from applying an improper voltage to a PC Card that was exchanged for another, different voltage, PC Card while the computer was in its Suspend operating mode.

Another object of the present invention is to provide a PC Card controller that prevents a computer, upon resuming normal operation after being in its Suspend operating mode, from experiencing a software breakdown caused by failing to detect an exchange of PC Cards while the computer was in its Suspend operating mode.

Briefly, the present invention is a PC Card controller adapted for use in a host computer which includes a central processing unit ("CPU"). The CPU of the host computer, particularly for laptop or notebook computers, generally has at least two operating modes. One operating mode of such a CPU is a higher power, normal operating-mode in which the CPU responds fully to all interrupt signals. Another operating mode of such a CPU is a lower power, Suspend operating-mode. If the CPU operates in the Suspend operating-mode, various devices included in the computer are turned off, and the CPU responds to only a limited class of interrupt signals, in particular the CPU responds to the SMI interrupt.

The PC Card controller includes a host-computer bus-interface adapted for exchanging digital signals, including interrupt signals, with a bus included in the host computer. Interrupt signals supplied to the bus of the host computer by the host-computer bus-interface are received and processed by the CPU when the CPU operates in its normal operating-mode.

The PC Card controller also includes a PC Card interface-circuit for exchanging digital signals with a PC Card inserted into a PC Card socket included in the host computer. When the CPU operates in its normal operating mode, insertion of a PC Card into the PC Card socket causes the PC Card interface-circuit to generate an interrupt signal that is transmitted to the CPU via the host-computer bus-interface.

The PC Card controller also includes a suspend/resume pin that receives a suspend/resume signal generated within the host computer. A first state of the suspend/resume signal indicates that the CPU is not operating in its Suspend operating-mode. Conversely, a second state of the suspend/resume signal indicates that the CPU is operating in its Suspend operating-mode.

The PC Card controller also includes a fake PC Card-insertion-interrupt generating-circuit. Upon detecting a change in the suspend/resume signal from the second state to the first state, the fake PC Card-interrupt generating-circuit generates, for transmission to the CPU via the host-computer bus-interface, an interrupt signal which simulates an insertion of a PC Card into the PC Card socket. Consequently, the computer program executed by the CPU, in the course of resuming normal CPU operation, upon receiving a simulated insertion of a PC Card into the PC Card socket, interrogates the PC Card socket to determine both the PC Card's operating voltage, and the type of PC Card then present in the PC Card socket. Determining both a PC Card's operating voltage, and the type of PC Card present in the PC Card socket upon resuming normal CPU operation ensures both supplying a proper voltage to the inserted PC Card, and execution of a computer program that properly accesses that PC Card.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 2 is a block diagram depicting the PC Card controller illustrated in FIG. I that simulates insertion of a PC Card into a PC Card socket upon detecting a change in a suspend/resume signal;

FIG. 3 is a block diagram depicting an alternative embodiment of the PC Card controller illustrated in FIG. 1 that simulates insertion of a PC Card into a PC Card socket upon detecting a change in a suspend/resume signal.

DETAILED DESCRIPTION OF THE PREFERRED EMBODIMENT

Figure 1:
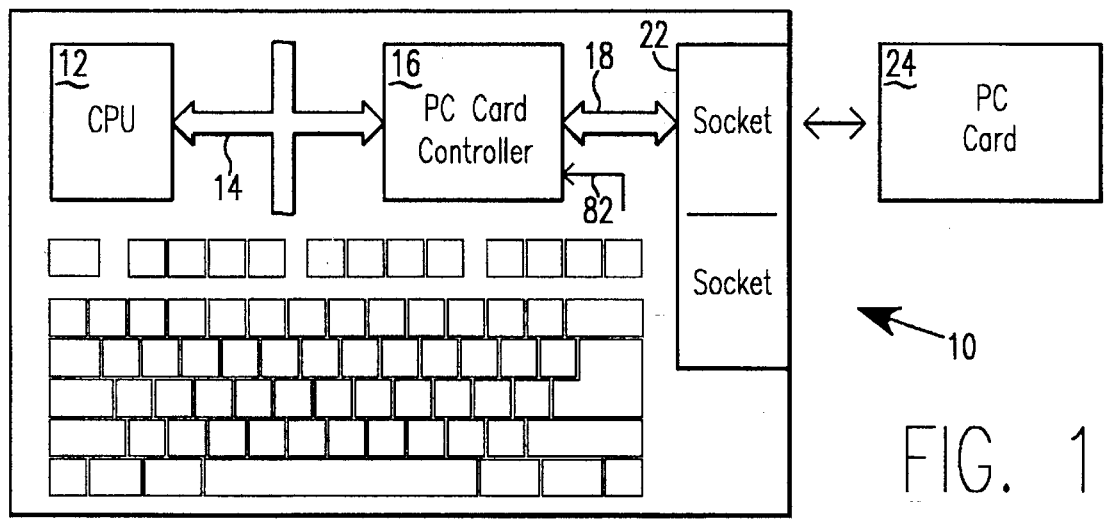
FIG. 1 is a block diagram depicting a laptop or notebook computer that includes a PC Card controller in accordance with the present invention.

FIG. 1 is a block diagram that depicts a laptop or notebook computer referred to by the general reference character 10. Of particular significance to the present invention is a central processing unit ("CPU") 12, included in the computer 10, that connects via a host-computer bus 14 to a PC Card controller IC 16. The host-computer bus 14 is preferably either an Industry Standard Architecture ("ISA") bus, or a Peripheral Component Interconnect ("PCI") bus. Accordingly, while the illustration of FIG. 1 depicts a direct connection of the PC Card controller 16 to the CPU 12, depending upon precise details of the computer 10, the PC Card controller 16 may connect directly via a single host-computer bus 14 to the CPU 12. Alternatively, one or more additional IC's and buses may be interposed between the PC Card controller 16 and the CPU 12.

As is well known in the art, during normal operation of the computer 10, the CPU 12 receives, and a computer program executed by the CPU 12 processes, interrupt signals from various devices included in the computer 10 such as a keyboard controller, a hard disk controller, a floppy disk controller, etc., that are not illustrated in FIG. 1. In particular, the PC Card controller 16 exchanges digital signals, including interrupt signals, with the CPU 12 via the host-computer bus 14.

The computer 10 also includes a PC Card bus 18 that connects the PC Card controller 16 to one or more PC Card sockets 22. During normal operation of the computer 10, the PC Card controller 16 exchanges digital signals with a PC Card 24 that is inserted into the PC Card socket 22. As described previously herein, the PC Card 24 may be arbitrarily selected from among any one of several different types of PC Cards that includes modems, hard disk drives, Flash RAM cards, etc.

Of particular significance to the present invention, during normal operation of the CPU 12, upon insertion of the PC Card 24 into the PC Card socket 22, the PC Card controller 16 transmits an interrupt signal to the CPU 12 via the host-computer bus 14. Upon such an interrupt signal's arrival at the CPU 12, a computer program executed by the CPU 12 interrogates the PC Card 24 via the PC Card controller 16 to determine a proper operating voltage for, and the type of PC Card 24 that has been inserted into the PC Card socket 22. Upon determining the type of PC Card 24 that has been inserted into the PC Card socket 22, the computer program executed by the CPU 12 initiates operation of a computer program specifically adapted for exchanging digital data with that particular type of PC Card 24.

As described previously herein, the CPU 12 of present laptop or notebook computers 12 generally provides at least two operating modes. One operating mode of the CPU 12 is the higher power, normal operating mode in which the CPU 12 responds to all possible interrupt signals, including interrupt signals from the PC Card controller 16. Such a CPU 12 also provides another lower power, Suspend operating mode during which various devices included in the computer 10 are turned-off, and the CPU 12 responds only to a limited class of interrupt signals.

In particular, while the CPU 12 operates in its Suspend operating mode, it does not receive and process interrupt signals from the PC Card controller 16. Consequently, if while the CPU 12 operates in its Suspend operating mode the PC Card 24 is removed from the PC Card socket 22 and a different type of PC Card 24 is inserted into the PC Card socket 22, the computer program executed by the CPU 12 fails to interrogate the PC Card 24, via the PC Card controller 16, to determine a proper operating voltage for, and the type of PC Card 24 that has been inserted into the PC Card socket 22. If the computer program fails to detect such a change in the type of PC Card 24 present in the PC Card socket 22, when the CPU 12 resumes normal operation it is possible that an improper voltage will be applied to the PC Card 24. Even if a proper voltage is applied to the PC Card 24, a likelihood still remains that, in most instances, a computer program executed by the CPU 12 will improperly exchange data with the PC Card 24. A usual consequence of such incorrect operation is that the computer 10 completely stops operating, and must be reinitialized, i.e. "booted," before it can resume operation.

Referring now to FIG. 2, depicted there, enclosed within a dashed line, is a block diagram of one embodiment of the PC Card controller 16. The PC Card controller 16 incorporates an interface to the host-computer bus 14 that includes a data-and-address bus-interface 32 and a control-and-interrupt-signals bus-interface 34. The data-and-address bus-interface 32 and the control-and-interrupt-signals bus-interface 34 exchange digital signals, including interrupt signals, with the CPU 12 via the host-computer bus 14. The data-and-address bus-interface 32 and the control-and-interrupt-signals bus-interface 34, which are conventional, exchange digital signals with each other internally within the PC Card controller 16 via a host-interface bus 36. Within the PC Card controller 16, an address-and-data bus 42 couples the data-and-address bus-interface 32 to a memory-address windower 44, to an I/O-address windower 46, to a data buffer 48, and to PC Card control-logic 52.

The memory-address windower 44 is coupled by a windowed-memory-address bus 54 to a memory-address offsetter 56. The memory-address offsetter 56 is coupled to a PC Card-address driver 58 by an offset-memory-address bus 62. An address portion 18a of the PC Card bus 18 couples the PC Card controller 16 to the PC Card socket 22. The data buffer 48, the PC Card control-logic 52 and the PC Card-address driver 58, in combination, provide a PC Card interface-circuit which exchanges digital signals with a PC Card 24 inserted into the PC Card socket 22.

If the PC Card 24 plugged into the PC Card socket 22 is a memory PC Card, numbers stored into the memory-address windower 44 by a computer program executed by the CPU 12 specify ranges of addresses on the host-computer bus 14 which access memory included in the PC Card 24. If an address on the host-computer bus 14 lies within a range specified by a pair of numbers stored into the memory-address windower 44, then the PC Card controller 16 permits an address to be transmitted to the memory PC Card 24. If the PC Card controller 16 is to transmit an address to the memory PC Card 24, a number stored into the memory-address offsetter 56 specifying an offset, i.e. difference, is added to the address which the PC Card controller 16 receives from the host-computer bus 14 to compute a memory address which the PC Card controller 16 transmits to the PC Card 24. The PC Card controller 16 preferably provides five (5) independently enabled and controlled memory address-windows and offsets. Preferably, each memory address-window can be located at any 4 k-byte boundary for addresses on the host-computer bus 14 that lie between 64 k-bytes and 16 M-byte.

The I/O-address windower 46 is coupled by a windowed-I/O-address bus 64 to the PC Card-address driver 58. PC Cards 24 such as modem and network PC Cards, which in accordance with PCMCIA-2.1, JEIDA-4.2 and ExCA standards operate as I/O devices rather than memory devices, may either require a specific I/O address range in the I/O address space of the host-computer bus 14, or may specify only a size for the PC card's I/O address space. Similar to the memory-address windower 44, the PC Card controller 16 includes the I/O-address windower 46 that permits the I/O address space of a PC Card 24, which specifies only a size for its I/O address space, to be located anywhere in the I/O address space of the host-computer bus 14. Thus, numbers stored into the I/O-address windower 46 by a computer program executed by the CPU 12 specify a range of addresses on the host-computer bus 14 for which the I/O-address windower 46 transmits the address signals, via the windowed-I/O-address bus 64, to the PC Card-address driver 58 so such a PC Card 24 may respond to I/O signals occurring on the host-computer bus 14. For the preferred ISA and PCI buses, the I/O address space of the host-computer bus 14 lies between zero (0) and 64 k-bytes, and the PC Card controller 16 preferably permits establishing two (2) independent I/O address windows, one I/O address window for each of two (2) different PC Card sockets 22.

The data buffer 48, which receives a buffer control signal from the control-and-interrupt-signals bus-interface 34 via a buffer-control-signal line 72, stores thirty-two (32) bits of data while such data is being exchanged between the host-computer bus 14 and a PC Card 24 inserted into the PC Card socket 22. Depending upon whether the PC Cards 24 are capable of eight (8) or sixteen (16) bit data transfers, the data buffer 48 also converts such thirty-two (32) bit data transfers to a sequence of eight (8) or sixteen (16) bit data transfers occurring via the PC Card socket 22 between the PC Card controller 16 and the PC Cards 24. Similarly, if the host-computer bus 14 has a capability of transferring only sixteen (16) bits, then the data buffer 48 converts the thirty-two (32) bits which it holds into two sixteen (16) bit data transfers occurring between the PC Card controller 16 and the host-computer bus 14. A data portion 18b of the PC Card bus 18 couples the PC Card controller 16 to the PC Card socket 22.

In addition to being coupled to the data-and-address bus-interface 32 via the address-and-data bus 42, the PC Card control-logic 52 is also coupled to the control-and-interrupt-signals bus-interface 34 by a control-and-interrupt-signals bus 76. Digital signals, exchanged between control-and-interrupt-signals bus-interface 34 and the PC Card control-logic 52 in conjunction with data exchanged between the PC Card control-logic 52 and the data-and-address bus-interface 32, effect proper operation of a PC Card 24 plugged into the PC Card socket 22. Such signals and data establish either a normal operating mode, or a lower power, suspend operating mode, for the PC Card controller 16. Specifically, if data stored into the PC Card controller 16 by a computer program executed by the CPU 12 disables all memory and I/O address windows, and places a one (1) into a power-downbit in a Global-Control register included in the PC Card controller 16, that is not separately illustrated in any of the FIGs., and all PC Card sockets 22 are empty, then the PC Card controller 16 enters its lower power, suspend operating mode. When the PC Card controller 16 operates in its lower power, suspend operating mode, by inhibiting clock signals throughout most of the PC Card controller 16 various internal registers within the PC Card controller 16 become inaccessible, and output signals from the PC Card controller 16 are disabled. However, even in the lower power, suspend operating mode of the PC Card controller 16, clock signals are not inhibited to the data-and-address bus-interface 32, the control-and-interrupt-signals bus-interface 34, and portions of the PC Card control-logic 52. Consequently, in the lower power, suspend operating mode a portion of the PC Card control-logic 52 remains active and interrupt signals may be transmitted from the control-and-interrupt-signals bus-interface 34 to the CPU 12.

To permit a computer program executed by the CPU 12 to detect insertion of a PC Card 24 into the PC Card socket 22, the PC Card control-logic 52 includes a Card-Status-Change Interrupt-Configuration register, that is not separately illustrated in any of the FIGs. Data stored into the Card-Status-Change Interrupt-Configuration register by a computer program executed by the CPU 12 assigns a card-status-change interrupt to a particular interrupt signal-line in the host-computer bus 14. The data stored into the Card-Status-Change Interrupt-Configuration register also enables or disables transmission of the card-status-change interrupt from the PC Card controller 16 to the CPU 12 via the host-computer bus 14.

The PC Card controller 16 also includes a Card-Status-Change register, that is also not separately illustrated in any of the FIGs. The Card-Status-Change register includes a card-change-detect bit that, during normal operation of the CPU 12 and of the PC Card controller 16, is set by insertion of a PC Card 24 into the PC Card socket 22. The PC Card controller 16 detects insertion of the PC Card 24 into the PC Card socket 22 by a change occurring on card-detect signal-lines included in a control-signal portion 18c of the PC Card bus 18 that couples the PC Card controller 16 to the PC Card socket 22.

If a computer program executed by the CPU 12 sets the Card-Status-Change Interrupt-Configuration register to enable transmission of the card-status-change interrupt, then the PC Card controller 16 transmits an interrupt to the CPU 12 upon setting of the card-change-detect bit in the Card-Status-Change register. Thus, during normal operation of the CPU 12 and of the PC Card controller 16, setting of the card-change-detect bit in the Card-Status-Change register by the PC Card controller 16 notifies a computer program executed by the CPU 12 that a PC Card 24 has been inserted into the PC Card socket 22.

Figure 4:
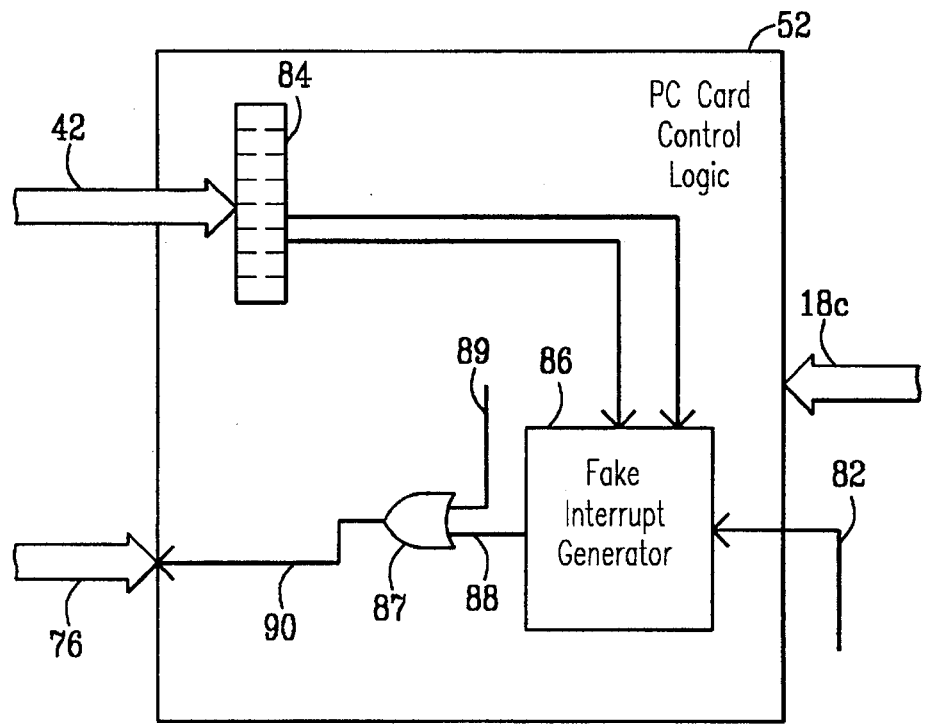
FIG. 4 is a block diagram depicting relevant portions of a PC Card control logic included in the PC Card controller depicted in FIGS. 2 and 3.

However, as set forth above, if the CPU 12 is operating in its lower power, Suspend operating mode, then it does not respond to receipt of an interrupt from the PC Card controller 16. To permit detection by the PC Card controller 16 of a change in the operation of the CPU 12 from its Suspend operating mode to its normal operating mode, the PC Card control-logic 52 also includes a suspend/resume pin 82 that receives a suspend/resume signal generated within the host computer. A first state of the suspend/resume signal indicates that the CPU is not operating in its Suspend operating-mode. Conversely, a second state of the suspend/resume signal indicates that the CPU is operating in its Suspend operating-mode. In general, the suspend/resume pin 82 is coupled within the computer 10 to a power control signal which turns-on the last, or nearly the last, device as a computer program executed by the CPU 12 ends Suspend mode operation of the CPU 12. Frequently, a suitable power control signal within a laptop or notebook computer 10 to be coupled to the suspend/resume pin 82 is display screen back-lighting. Referring now to FIG. 4, to facilitate accommodating the PC Card controller 16 to various different designs for laptop and notebook computers 12, data stored into a Mode-Control register 84 included in the PC Card controller 16 either activate or deactivate a fake interrupt-generator 86 of the PC Card controller 16 for responding to a signal applied to the suspend/resume pin 82. Data stored into the Mode-Control register 84 also configure the PC Card controller 16 to respond either to a falling edge or to a rising edge of the signal applied to the suspend/resume pin 82.

The response of the PC Card controller 16 to detecting a change in the operation of the CPU 12 from its Suspend operating mode to its normal operating mode is to simulate, i.e. fake, insertion of a PC Card 24 into the PC Card socket 22 regardless of whether such an event has actually occurred. To fake insertion of a PC Card 24 into the PC Card socket 22, the fake interrupt-generator 86 transmits a fake interrupt signal to an input of an OR gate 87 via a fake-interrupt signal-line 88. The real PC Card insertion interrupt signal transmitted from the Card-Status-Change register is applied to a second input to the OR gate 87 via a real PC Card-interrupt signal-line 89. A PC Card-interrupt output-signal-line 90 from the OR gate 87 transmits either a conventional or a fake PC card interrupt signal to the control-and-interrupt-signals bus 76 for transmission to the control-and-interrupt-signals bus-interface 34.

Consequently, by faking a PC Card insertion interrupt upon resumption of normal operation by the CPU 12, the PC Card controller 16 forces a computer program executed by the CPU 12, that controls operation of the computer 10, to execute PC Card initialization routines that are normally executed in response to and immediately after each insertion of a PC Card 24 into the PC Card socket 22. Execution of the PC Card initialization routines every time the computer program executed by the CPU 12 ends the Suspend operating mode forces such routines, on each such occasion, to interrogate the PC Card 24 to determine precisely the power supply voltage requirement and operating characteristics of any PC Cards 24 then inserted into the PC Card sockets 22. In this way, the PC Card controller 16 prevents the computer 10, upon resuming normal operation after being in its Suspend operating mode, from failing to detect an exchange of PC Cards 24 while the computer was in its Suspend operating mode. Consequently, a PC Card controller 16 in accordance with the present invention prevents the computer 10, upon resuming normal operation after being in its Suspend operating mode, from applying an improper voltage to a PC Card 24 that was exchanged for another, different voltage, PC Card 24 while the computer was in its Suspend operating mode, or from experiencing a software breakdown due to a failure to detect an exchange of PC Cards while the computer was in its Suspend operating mode.

In addition to the normal operating mode and the lower power, suspend operating mode of the PC Card controller 16, the computer 10 may be designed to permit a computer program executed by the CPU 12 to turn-off electrical power that is normally supplied to the PC Card controller 16. To prevent failing to detect an exchange of PC Cards 24 while electrical power to the PC Card controller 16 is turned-off, a power-on initialization sequence performed by the PC Card controller 16 every time the PC Card controller 16 is turned-on also causes the fake interrupt-generator 86 to generate an interrupt faking insertion of a PC Card 24 into the PC Card socket 22 regardless of whether such an event has actually occurred. In this way, even if electrical power is removed from the PC Card controller 16, a PC Card controller 16 in accordance with the present invention prevents the computer 10, upon restoring the PC Card controller 16 to normal operation after being turned-off, from applying an improper voltage to a PC Card 24 that was exchanged for another, different voltage, PC Card 24 while the PC Card controller 16 was turned-off, or from experiencing a software breakdown due to a failure to detect an exchange of PC Cards while the PC Card controller 16 was turned-off.

Referring again to FIG. 2, to permit supplying electrical power at a proper voltage to a PC Card 24 inserted into the PC Card socket 22, as illustrated in FIG. 2 the computer 10 includes a metal oxide silicon ("MOS") field effect transistor ("FET") switch 92 that is coupled to the PC Card socket 22 by a PC Card socket-power line 18d. A DC-DC converter included in the computer 10, that is not separately illustrated in any of the FIGs., supplies electrical power to the MOS FET switch 92 at potentials respectively of zero (0.0) volts ("V"), 3.0 V, 5.0 V, and 12.0 V via power supply leads 94a–94d. To control the voltage supplied by the MOS FET switch 92 to the PC Card socket 22 via the PC Card socket-power line 18d, the MOS FET switch 92 preferably operates in accordance with either a Texas Instruments TP2202IDF serial signaling mode, an External-Hardware Serial Signaling mode, or an Intel System Management Bus Signaling mode. To accommodate selection of any one of these three power control operating modes, the PC Card controller 16 includes a PC Card power controller 96 that, in conjunction with a 32 kHz clock signal received by the PC Card controller 16, transmits control signals to the MOS FET switch 92 over two signal lines included in a MOS FET switch control-bus 98. The PC Card power controller 96 receives signals for controlling its operation from the control-and-interrupt-signals bus-interface 34 via a power-control-signal bus 102.

The PC Card controller 16 may be configured by data stored into a Power-Control register included in the PC Card controller 16, that is not separately illustrated in any of the FIGs., to operate in differing modes for controlling the electrical power supplied to the PC Cards 24 via the MOS FET switch 92 and the PC Card socket 22. In one operating mode of the PC Card controller 16, the voltage supplied by the MOS FET switch 92 to the PC Card 24 is determined by the response that the PC Card 24 provides to an interrogation by the PC Card controller 16 of the PC Card 24 about its operating voltage. In another operating mode of the PC Card controller 16, data stored into the Power-Control register determines the voltage supplied by the MOS FET switch 92 to the PC Card 24. This second mode of operation permits supplying 12 volts to the PC Card 24 as is required by some PC Cards for storing data into Flash RAM.

FIG. 3 illustrates an alternative embodiment of the PC Card controller 16. Those elements depicted in FIG. 3 that are common to the PC Card controller 16 depicted in FIG. 2 carry the same reference numeral distinguished by a prime ("'") designation. In the embodiment of the PC Card controller 16 depicted in FIG. 3, the windowed-I/O-address bus 64', rather than transmitting address signals directly to the PC Card-address driver 58', transmits the address signals to an I/O-address offsetter 66. The I/O-address offsetter 66 is coupled to the PC Card-address driver 58' by an offset-I/O-address bus 68. When the PC Card controller 16 transmits an address to an I/O PC Card 24, a number stored into the I/O-address offsetter 66 specifying an offset, i.e. difference, is added to the address which the PC Card controller 16 receives from the host-computer bus 14 to compute an I/O address which the PC Card controller 16 transmits to the PC Card 24. The addition of the I/O-address offsetter 66 to the PC Card controller 16 depicted in FIG. 2 permits readily accommodating I/O PC Cards 24 that require a specific I/O address range in the I/O address space of the host-computer bus 14.

Although the present invention has been described in terms of the presently preferred embodiment, it is to be understood that such disclosure is purely illustrative and is not to be interpreted as limiting. While establishing of an operating mode for the PC Card controller 16 is preferably performed by storing digital data into various registers included in the PC Card controller 16, operating mode selection could also be performed by applying a signal or signals to a pin or pins of the PC Card controller 16. Similarly, while storage of data into the Mode-Control register 84 also selects a specific polarity for the signal change which causes the PC Card controller 16 to fake insertion of a PC Card 24 into the PC Card socket 22 in response to a change in a suspend/resume signal, such signal polarity selection could also be performed by applying a signal to a particular pin of the PC Card controller 16. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A PC Card controller adapted for use in a host computer which includes a central processing unit ("CPU"), the CPU having at least two operating modes, one operating mode of the CPU being a normal operating-mode and another operating mode of the CPU being a lower power, Suspend operating-mode, the CPU responding only to a limited class of interrupt signals while operating in the Suspend operating-mode, the PC Card controller comprising:

a host-computer bus-interface adapted for exchanging digital signals, including interrupt signals, with a bus included in the host computer, interrupt signals supplied to the bus of the host computer by said host-computer bus-interface being received and processed by the CPU if the CPU is operating in the normal operating-mode;

a PC Card interface-circuit for exchanging digital signals with a PC Card inserted into a PC Card socket included in the host computer, during normal operation of the CPU said PC Card interface-circuit generating an interrupt signal for transmission to the CPU via said host-computer bus-interface upon insertion of a PC Card into the PC Card socket;

a suspend/resume pin for receiving a suspend/resume signal which, in a first state of the suspend/resume signal, indicates that the CPU is not operating in the Suspend operating-mode, and which, in a second state of the suspend/resume signal, indicates that the CPU is operating in the Suspend operating-mode; and a fake PC Card-insertion-interrupt generator which, upon detecting a change in the suspend/resume signal from the second state to the first state, generates, for transmission to the CPU via said host-computer bus-interface, an interrupt signal that simulates insertion of a PC Card into the PC Card socket.

2. The PC Card controller of claim 1 wherein the PC Card controller may be enabled to operate either in one or in another operating mode selected from at least two operating modes of the PC Card controller.

3. The PC Card controller of claim 2 wherein the PC Card controller includes a mode control register for receiving digital data which selects a particular operating mode for the PC Card controller.

4. The PC Card controller of claim 2 wherein the PC Card controller, when operating in a particular operating mode, disables said fake PC Card-insertion-interrupt generator so said fake PC Card-insertion-interrupt generator does not generate the interrupt signal which simulates an insertion of a PC Card into the PC Card socket.

5. The PC Card controller of claim 1 wherein data supplied to the PC Card controller selects a polarity for the change in the suspend/resume signal that causes said fake PC Card-insertion-interrupt generator to simulate insertion of a PC Card into the PC Card socket.

6. The PC Card controller of claim 1 wherein said fake PC Card-insertion-interrupt generator, upon application of electrical power to said PC Card controller, also generates, for transmission to the CPU via said host-computer bus-interface, the interrupt signal that simulates insertion of a PC Card into the PC Card socket.

7. A computer comprising:

a CPU having at least two operating modes, one operating mode of the CPU being a normal operating-mode and another operating mode of the CPU being a lower power, Suspend operating-mode, the CPU responding only to a limited class of interrupt signals while operating in the Suspend operating-mode; and a PC Card controller including:

a host-computer bus-interface adapted for exchanging digital signals, including interrupt signals, with a bus included in the computer, interrupt signals supplied to the bus of the computer by said host-computer bus-interface being received and processed by the CPU if the CPU is operating in the normal operating-mode;

a PC Card interface-circuit for exchanging digital signals with a PC Card inserted into a PC Card socket included in the computer, during normal operation of the CPU said PC Card interface-circuit generating an interrupt signal for transmission to the CPU via said host-computer bus-interface upon insertion of a PC Card into the PC Card socket;

a suspend/resume pin for receiving a suspend/resume signal which, in a first state of the suspend/resume signal, indicates that the CPU is not operating in the Suspend operating-mode, and which, in a second state of the suspend/resume signal, indicates that the CPU is operating in the Suspend operating-mode; and a fake PC Card-insertion-interrupt generator which, upon detecting a change in the suspend/resume signal from the second state to the first state, generates, for transmission to the CPU via said host-computer bus-interface, an interrupt signal that simulates insertion of a PC Card into the PC Card socket.

8. The computer of claim 7 wherein the PC Card controller may be enabled to operate either in one or in another operating mode selected from at least two operating modes of the PC Card controller.

9. The computer of claim 8 wherein the PC Card controller includes a mode control register for receiving digital data which selects a particular operating mode for the PC Card controller.

10. The computer of claim 8 wherein the PC Card controller, when operating in a particular operating mode, disables said fake PC Card-insertion-interrupt generator so said fake PC Card-insertion-interrupt generator does not generate the interrupt signal which simulates an insertion of a PC Card into the PC Card socket.

11. The computer of claim 7 wherein data supplied to the PC Card controller selects a polarity for the change in the suspend/resume signal that causes said fake PC Card-insertion-interrupt generator to simulate insertion of a PC Card into the PC Card socket.

12. The computer of claim 7 wherein said fake PC Card-insertion-interrupt generator, upon application of electrical power to said PC Card controller, also generates, for transmission to the CPU via said host-computer bus-interface, the interrupt signal that simulates insertion of a PC Card into the PC Card socket.

13. A method for operating a PC Card controller adapted for use in a computer which includes a CPU, the CPU having at least two operating modes, one operating mode of the CPU being a normal operating-mode and another operating mode of the CPU being a lower power, Suspend operating-mode, the CPU responding only to a limited class of interrupt signals while operating in the Suspend operating-mode, the method comprising the steps of:

exchanging digital signals, including interrupt signals, between the PC Card controller and a bus included in the computer, interrupt signals supplied to the bus of the computer by the PC Card controller being received and processed by the CPU if the CPU is operating in the normal operating-mode;

exchanging digital signals between the PC Card controller and a PC Card inserted into a PC Card socket included in the computer, during normal operation of the CPU the PC Card controller generating an interrupt signal for transmission to the CPU via the bus upon insertion of a PC Card into the PC Card socket;

supplying a suspend/resume signal to a suspend/resume pin of the PC Card controller, the suspend/resume signal in a first state indicating that the CPU is not operating in the Suspend operating-mode, and in a second state indicating that the CPU is operating in the Suspend operating-mode; and upon detecting a change in the suspend/resume signal from the second state to the first state, generating, for transmission to the CPU via the host-computer bus-interface, an interrupt signal that simulates insertion of a PC Card into the PC Card socket.

14. The method of claim 13 further comprising the step of enabling the PC Card controller to operate either in one or in another operating mode selected from at least two operating modes of the PC Card controller.

15. The method of claim 14 further comprising the step of receiving into a mode control register included in the PC Card controller digital data which selects a particular operating mode for the PC Card controller.

16. The method of claim 14 wherein the PC Card controller, when operating in a particular operating mode, does not generate the interrupt signal which simulates an insertion of a PC Card into the PC Card socket.

17. The method of claim 13 further comprising the step of selecting a polarity for the change in the suspend/resume signal that causes the PC Card controller to simulate insertion of a PC Card into the PC Card socket.

18. The method of claim 13 further comprising the step of, upon application of electrical power to a PC Card controller, generating, for transmission to the CPU via the host-computer bus-interface, the interrupt signal that simulates insertion of a PC Card into the PC Card socket.

* * * * *